United States Patent
Smith (10) Patent No.: US 7,678,441 B2
(45) Date of Patent: *Mar. 16, 2010

(54) INTERLAYERS FOR LAMINATED SAFETY GLASS WITH SUPERIOR DE-AIRING AND LAMINATING PROPERTIES AND PROCESS FOR MAKING THE SAME

(75) Inventor: Charles Anthony Smith, Vienna, WV (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/725,622

(22) Filed: Mar. 20, 2007

(65) Prior Publication Data

US 2008/0286530 A1    Nov. 20, 2008

Related U.S. Application Data

(63) Continuation-in-part of application No. 11/292,721, filed on Dec. 2, 2005, now Pat. No. 7,351,468.

(51) Int. Cl.
*B32B 17/10* (2006.01)
(52) U.S. Cl. ............... 428/141; 428/156; 428/172; 428/183; 428/441; 428/442
(58) Field of Classification Search ............... 428/141, 428/156, 172, 183, 441, 442
See application file for complete search history.

(56) References Cited

U.S. PATENT DOCUMENTS

| 2,904,844 | A | 9/1959 | Smithies |
| 3,264,272 | A | 8/1966 | Rees |
| 3,344,014 | A | 9/1967 | Rees |
| 3,404,134 | A | 10/1968 | Rees |
| 3,437,718 | A | 4/1969 | Rees |
| 3,471,460 | A | 10/1969 | Rees |
| 4,035,549 | A | 7/1977 | Kennar |
| 4,323,247 | A | 4/1982 | Keches et al. |

(Continued)

FOREIGN PATENT DOCUMENTS

EP    0476330 B1    3/1992

(Continued)

OTHER PUBLICATIONS

Webster's New World Dictionary of American English, Third College Edition, Copyright © 1988 by Simon & Schuster, Inc., p. 835.

(Continued)

*Primary Examiner*—D. S Nakarani
(74) *Attorney, Agent, or Firm*—Kevin Dobson; Tong Li; Mark Kuller (57) ABSTRACT

This invention relates to thermoplastic interlayer sheets or films for laminated safety glass with superior vacuum de-airing at elevated temperatures and superior tacking and edge sealing properties. The sheeting has an embossed surface pattern on at least one of the surfaces, which provides relatively uninterrupted channels for de-airing in at least two non-parallel directions, wherein the channels are spaced about 0.1 to about 1 mm apart and have a depth of less than about 25 μm and a width of about 30 to about 300 μm.

22 Claims, 6 Drawing Sheets

U.S. PATENT DOCUMENTS

| | | | |
|---|---|---|---|
| 4,452,840 | A | 6/1984 | Sato et al. |
| 4,452,935 | A | 6/1984 | Nomura et al. |
| 4,619,973 | A | 10/1986 | Smith |
| 4,663,228 | A | 5/1987 | Bolton et al. |
| 4,668,574 | A | 5/1987 | Bolton et al. |
| 4,799,346 | A | 1/1989 | Bolton et al. |
| 4,906,703 | A | 3/1990 | Bolton et al. |
| 5,002,820 | A | 3/1991 | Bolton et al. |
| 5,061,748 | A | 10/1991 | Bolton et al. |
| 5,091,258 | A | 2/1992 | Moran |
| 5,124,208 | A | 6/1992 | Bolton et al. |
| 5,344,513 | A | 9/1994 | Takemaka |
| 5,455,103 | A | 10/1995 | Hoagland et al. |
| 5,496,640 | A | 3/1996 | Botlon et al. |
| 5,532,066 | A | 7/1996 | Latiolais et al. |
| 5,536,347 | A | 7/1996 | Moran |
| 5,626,809 | A | 5/1997 | Mortelmans |
| 5,763,062 | A | 6/1998 | Smith et al. |
| 5,895,721 | A | 4/1999 | Naoumenko et al. |
| 6,093,471 | A | 7/2000 | Hopfe et al. |
| 6,159,608 | A | 12/2000 | Friedman et al. |
| 6,479,155 | B1 | 11/2002 | Gelderie et al. |
| 6,660,556 | B2 | 12/2003 | Hashimoto et al. |
| 6,800,355 | B2 | 10/2004 | Wong |
| 6,863,956 | B1 | 3/2005 | Nakajima et al. |
| 2002/0155302 | A1 | 10/2002 | Smith et al. |
| 2003/0012964 | A1 | 1/2003 | Choi et al. |
| 2003/0022015 | A1 | 1/2003 | Wong |
| 2003/0044579 | A1 | 3/2003 | Bolton et al. |
| 2003/0098060 | A1 | 5/2003 | Yoshimi |
| 2003/0124296 | A1 | 7/2003 | Smith |
| 2006/0141212 | A1 | 6/2006 | Smith et al. |

FOREIGN PATENT DOCUMENTS

| | | |
|---|---|---|
| EP | 0 483 087 A1 | 4/1992 |
| EP | 0785064 A1 | 7/1997 |
| GB | 828381 | 2/1960 |
| WO | WO 96/41717 | 12/1996 |
| WO | WO 99/58334 | 11/1999 |

OTHER PUBLICATIONS

Abstract for JP 08295541, Nov. 12, 1996, DuPont Mitsui Polychem Co. Ltd.

PCT International Search Report for International application No. PCT/US99/10354 dated Sep. 3, 1999.

PCT International Preliminary Examination Report for International application No. PCT/US99/110354 dated Sep. 20, 2000.

PCT International Search Report and Written Opinion for International Application No. PCT/US2006/046056 dated Apr. 10, 2007.

European Search report and European search opinion for European Patent Application 06 021 206.5-2124 dated Feb. 1, 2007.

'Surlyn® [SPEC0416] 1707 packaging resin', Internet brochure by DuPont Packaging [SPEC0417] 1995-2003.

INTERLAYERS FOR LAMINATED SAFETY GLASS WITH SUPERIOR DE-AIRING AND LAMINATING PROPERTIES AND PROCESS FOR MAKING THE SAME

PRIORITY CLAIMS

This application is a continuation-in-part of U.S. application Ser. No. 11/292,721, filed on Dec. 2, 2005, now U.S. Pat. No. 7,351,468, which is incorporated herein by reference.

BACKGROUND OF THE INVENTION

In the fabrication of laminated safety glass, it is customary to place a piece of thermoplastic sheeting between two pieces of float glass. It is also common that the thermoplastic interlayer's surface can be roughened to avoid blocking, i.e., one layer of interlayer sticking to another. The roughness on the interlayer can also allow the interlayer to be moved while the two pieces of glass are aligned as the glass/interlayer/glass sandwich (hereinafter, "assembly") is constructed. In constructing such an assembly, air is trapped in the interstitial space between the glass surface and the bulk of the thermoplastic interlayer. Trapped air can be removed either by vacuum de-airing or by nipping the assembly between a pair of rollers.

The degree to which air must be removed (reduced) from between the glass and interlayer will depend on the nature of the interlayer to absorb the air (dissolution) during further lamination steps, e.g., autoclaving, such that the air forms a 'solution' with the interlayer. The presence of a gaseous phase within the laminate will take the form of bubbles or pockets of gas between the interlayer and glass interface. These are generally objectionable for end-use applications where the laminate functions as a transparent article, which is, being essentially free of optical defects (e.g. relatively low-haze thus providing a transparent article without hindering visibility). Autoclaving is a step typically utilized in the production of laminated glass using a combination of heat and pressure to hasten the dissolution of any residual air (gaseous component) within the laminate assembly. As external pressure on the laminate is increased (by thermodynamic principals), it restricts the ability for gaseous components to either remain or to form. After the lamination process, the desire for creation of a 'solid-phase' interlayer, essentially free of a gas phase, is paramount. Additionally, the laminate should remain 'bubble-free' for a substantial period of time (years) under end-use conditions to fulfill its commercial role. It is not an uncommon defect in laminated glass for dissolved gasses to come out of solution (form bubbles or, delaminated areas between the glass/interlayer interface) as time progresses, especially at elevated temperatures experienced in automobiles, buildings and the like, often due to weather conditions and sunlight exposure.

In the case of vacuum de-airing, air is removed while the assembly is at ambient temperature. Tacking of the interlayer to the glass and sealing of the edges is accomplished by heating the entire assembly while it is still under vacuum. The assembly, after the heating step, is generally referred to as a pre-press or a pre-laminate.

In the case of nipping, the assembly is generally heated to a temperature between 50-100° C., and is then passed through one or more sets of nip rolls. Edge sealing is accomplished by the force of the rollers exerted on the two pieces of glass. At the end of the nipping step, the assembly is called a pre-press. In windshield manufacture, the nip rolls are often articulated so as to accommodate the curvature in the windshield. When complex shapes and angles are involved, or when several models of windshields are made concurrently, it is often more convenient to use the vacuum de-airing method.

However, laminators may encounter an issue when selecting a suitable interlayer. It is sometimes difficult to choose an interlayer with optimal features for pre-pressing, namely, rapid air removal and proper edge seal. Interlayers which have rougher surfaces as measured by the 10-point roughness (ISO R468), Rz, can allow for faster de-airing. However, such interlayers can make it inconvenient to obtain edge seal as more energy is generally required to compact the rough interlayer. If the edges of the pre-press are not completely sealed, air can penetrate the edge in the autoclaving step where the pre-press is heated under high pressure, and can cause visual defects in the laminate which is commercially unacceptable. Laminators who use vacuum for de-airing in hot environments can have added difficulty. Moreover, interlayers that are rough and allow for rapid de-airing at room temperature (23° C.) often do not de-air as well when the ambient temperature is much above 30° C.

On the other hand, relatively smooth interlayers can lead to edge sealing before sufficient air is removed, and can leave air trapped inside the pre-press. This problem is commonly referred to as pre-mature edge seal, and can be especially common with polyvinyl butyral (PVB) interlayers. During autoclaving, the excess air may be forced into solution under high pressure, but may return to the gas phase after autoclaving. Defects which occur after lamination are often more costly to rectify.

Safety glasses can be obtained using various types of interlayer materials, including, for example, PVB; thermoplastic polyurethane (TPU); ethylene copolymers such as ethylene vinyl acetate (EVA); silicone polymers; polyvinyl chloride (PVC); and ethylene acid copolymers and ionomers derived therefrom. Polymeric interlayer materials are thermoplastic. Thermoplastic interlayers are typically heated during the lamination process to soften the interlayer and facilitate adhesion to glass or plastic material. Surface patterns on the interlayers can be provided to allow for rapid de-airing even at high temperatures, and also allow good edge seal to be obtained. Choice or design of an ideal surface pattern can depend on the lamination process parameters as well as on the interlayer material. For example, plasticized PVB, which is often used in safety glass as an interlayer material, is tacky and can be readily adhered to glass even at room temperature. Various surface patterns can be used on the surface(s) of interlayer sheeting formed of plasticized PVB, but typically the patterns are designed to account for the physical characteristics of the specific interlayer and/or the specific process. For specific PVB interlayer surface patterns designed for safety glass glazing applications, see, e.g., U.S. Pat. Nos. 4,452,935; 5,091,258; 5,455,103; 5,626,809; 6,093,471; 6,800,355; and 6,863,956.

For interlayer sheeting formed from unplasticized high modulus polymeric materials, such as, ethylene acid copolymers or ionomers derived therefrom, the physical properties of such sheeting can be substantially different from those of the interlayer sheeting obtained from other materials, such as plasticized PVB. Due to these differences, surface patterns useful for plasticized PVB interlayer sheeting may not be ideal for interlayer sheeting that is formed of unplasticized high modulus polymeric materials, and vice versa. In accordance to the present invention, "high modulus polymeric materials" are those polymeric materials having a Storage Young's Modulus of 50-1,000 MPa (mega Pascals) at 0.3 Hz and 25° C. determined according to ASTM D 5026-95a.

Polymeric materials that fall into this modulus range may include, but are not limited to, certain non-plasticized or low plasticized grades of polyvinyl butyral (PVB); polyurethane (PU); polyvinylchloride (PVC); metallocene-catalyzed linear low density polyethylenes; ethylenevinyl acetate (EVA); ethylene acid copolymers and ionomers derived therefrom; polymeric fatty acid polyamides; polyester resins such as poly(ethylene terephthalate); silicone elastomers; epoxy resins; elastomeric and crystalline polycarbonates; and the like.

Specifically, the surface patterns for interlayer sheeting formed of plasticized PVB, for example, tend to be deep to allow air to escape during the lamination process. The broad melting or softening range of plasticized PVB allows the use of such deep patterns. However, the use of deep patterns on interlayer sheeting formed of unplasticized high modulus polymers can be problematic. This is because sheets or films formed of unplasticized high modulus polymers are much stiffer than those formed of PVB, and therefore, during the pre-pressing process, more heat and/or energy will be required to compress such sheets or films having a deep surface pattern. In addition, sheets or films formed of unplasticized high modulus polymers, such as ionomers, in particular, are prone to attract dirt and therefore deep patterns tend to allow more dust or dirt to settle on the surface of the interlayer sheet or film and can give rise to "pattern haze" in laminates comprising the same. Also, the sharper melting range of an unplasticized, non-cured (non-cross-linked) interlayer sheet or film can lead to trapped air in the laminate.

The present invention provides certain surface patterns which can effectively facilitate de-airing during the lamination process when they are incorporated on the surface(s) of interlayer sheets or films formed of unplasticized high modulus polymeric compositions.

SUMMARY OF THE INVENTION

The present invention is directed to a thermoplastic interlayer sheet or film comprising an unplasticized polymer and at least one embossed surface, wherein the embossed surface comprises a surface pattern that provides relatively uninterrupted channels for de-airing in at least two non-parallel directions, wherein said channels are spaced about 0.1 to about 1 mm apart and have a depth of about 2 to about 25 µm and a width of about 30 to about 300 µm.

In one preferred embodiment, the unplasticized polymer used herein is an ethylene acid copolymer or an ionomer derived therefrom.

In another preferred embodiment, the at least one embossed surface has a total area roughness, $AR_t$, of less than 32 µm, a ratio of $AR_p/AR_t$ of between 0.42 and 0.62, and an area kurtosis, AKu, of less than about 5.

In yet another preferred embodiment, both surfaces of the thermoplastic interlayer sheet or film comprises an embossed surface pattern that provides relatively uninterrupted channels for de-airing in at least two non-parallel directions, wherein said channels are spaced about 0.1 to 1 mm apart and have a depth of less than about 25 µm and a width of about 30 to 300 µm.

In addition, the present invention is directed to a pre-laminate comprising the thermoplastic interlayer sheet or film and a glass surface. Preferably, the glass laminate of the present invention comprises two layers of glass and therebetween laminated the at least one layer of the thermoplastic interlayer sheet or film.

The invention is further directed to a process of preparing a glass laminate comprising providing the pre-laminate and laminating the thermoplastic interlayer sheet to the glass surface.

BRIEF DESCRIPTION OF THE DRAWINGS

The present invention is illustrated by way of example and not limitation in the accompanying figures.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

The materials, methods, and examples herein are illustrative only and, except as specifically stated, are not intended to be limiting.

Interlayer Sheets or Films

In one embodiment, the present invention is an interlayer sheet or film suitable for use in laminar structures comprising at least one ply of glass. An interlayer sheet or film of the present invention is a thermoplastic interlayer that can be heated and be caused to form an adhesive bond with other interlayer materials, with rigid plastic materials, and/or with glass. More specifically, the interlayer sheet or film of the present invention is formed of an unplasticized high modulus polymeric composition, such as an ethylene acid copolymer or an ionomer derived therefrom, and has one or both surfaces being embossed with certain patterns.

Polymers

As used herein, the unplasticized high modulus polymeric material may be an ethylene acid copolymer, or an ionomer derived therefrom, or a combination thereof.

In accordance to the present invention, the ethylene acid copolymer used herein is a copolymer of polymerized residues of alpha olefin(s) and polymerized residues of alpha, beta ethylenically unsaturated carboxylic acid comonomer(s) and the ionomers used herein are derived from certain ethylene acid copolymers that are partial or fully neutralized with metallic ion(s). The ethylene acid copolymers and the ionomers independently contain from about 1 to about 30 weight percent of polymerized residues of alpha, beta ethylenically unsaturated carboxylic acid comonomers based on the total weight of each copolymer. Preferably, the acid copolymers and the ionomers independently contain from about 5 to about 25 weight percent, or more preferably, from about 10 to about 22 weight percent, of polymerized residues of alpha, beta ethylenically unsaturated carboxylic acid comonomers based on the total weight of each copolymer for enhanced adhesion and physical properties, such as higher flexural moduli and stiffness. The alpha olefin used herein may incorporate from 2 to 10 carbon atoms. Preferably, the alpha olefin is selected from the group consisting of ethylene, propylene, 1-butene, 1-pentene, 1-hexene, 1-heptene, 3-methyl-1-butene, 4-methyl-1-pentene, and the like and mixtures thereof. More preferably, the alpha olefin is ethylene. Preferably, the alpha, beta ethylenically unsaturated carboxylic acid comonomers used herein are selected from the group consisting of acrylic acid, methacrylic acid, itaconic acid, maleic acid, maleic anhydride, fumaric acid, monomethyl maleic acid, and mixtures thereof. More preferably, the alpha, beta ethylenically unsaturated carboxylic acid comonomers are selected from the group consisting of acrylic acid, methacrylic acid and mixtures thereof.

The ethylene acid copolymers and the ionomers may optionally independently contain other unsaturated comonomers. Specific examples of preferable other unsaturated comonomers include, but are not limited to, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl furnarate, dibutyl fumarate, dimenthyl fumarate, vinyl acetate, vinyl propionate, and the like and mixtures thereof. Preferably, the other unsaturated comonomers are selected from the group consisting of; methyl acrylate, methyl methacrylate, butyl acrylate, butyl methacrylate, glycidyl methacrylate, vinyl acetate, and mixtures thereof. Preferably, the acid copolymers and ionomers used herein incorporate from 0 to about 50 weight percent, or more preferably, from 0 to about 30 weight percent, or, yet more preferably, from 0 to 20 weight percent, of polymerized residues of the other unsaturated comonomer, based on the total weight of the composition. The ethylene acid copolymers used herein may be polymerized as disclosed in, e.g., U.S. Pat. Nos. 3,404,134; 5,028,674; 6,500,888; and 6,518,365.

Neutralization

The ethylene acid copolymers used herein may be neutralized from 0 to about 100 percent with metallic ions based on the total carboxylic acid content to produce the ionomers. The metallic ions may be monovalent, divalent, trivalent, multivalent, and mixtures thereof. Preferable monovalent metallic ions include, but are not limited to, sodium, potassium, lithium, silver, mercury, copper, and the like and mixtures thereof. Preferable divalent metallic ions include, but are not limited to, beryllium, magnesium, calcium, strontium, barium, copper, cadmium, mercury, tin, lead, iron, cobalt, nickel, zinc, and the like and mixtures thereof. Preferable trivalent metallic ions include, but are not limited to, aluminum, scandium, iron, yttrium, and the like and mixtures thereof. Preferable multivalent metallic ions include, but are not limited to, titanium, zirconium, hafnium, vanadium, tantalum, tungsten, chromium, cerium, iron, and the like and mixtures thereof. Preferably, when the metallic ion is multivalent, complexing agents, such as stearate, oleate, salicylate, and phenolate radicals, are included, as disclosed within U.S. Pat. No. 3,404,134. More preferably, the metallic ion is selected from the group consisting of sodium, lithium, magnesium, zinc, aluminum, and mixtures thereof. Most preferably, the metallic ion is selected from the group consisting of sodium, zinc, and mixtures thereof. Preferably, the acid copolymers are neutralized from about 10 to about 90 percent, or more preferably, from about 20 to about 80 percent, with metallic ions based on the total carboxylic acid content. The ethylene acid copolymers used herein may be neutralized as disclosed in, e.g., U.S. Pat. No. 3,404,134.

Additives

The unplasticized high modulus polymeric compositions used herein may further incorporate additives which effectively reduce the melt flow of the resin, to the limit of producing thermoset films and sheets. The use of such additives will enhance the upper end-use temperature of the sheet or film and laminates produced therefrom. Typically, the end-use temperature will be enhanced up to 20° C. to 70° C. In addition, laminates produced from such materials will be fire resistant. By reducing the melt flow of the interlayer sheet or film, the material will have a reduced tendency to melt and flow out of the laminate and, in turn, serve as additional fuel for a fire. Specific examples of melt flow reducing additives include organic peroxides, such as 2,5-dimethylhexane-2,5-dihydroperoxide, 2,5-dimethyl-2,5-di(tert-betylperoxy)hexane-3, d i-tert-butyl peroxide, tert-butylcumyl peroxide, 2,5-dimethyl-2,5-di(tert-butylperoxy)hexane, dicumyl peroxide, alpha, alpha'-bis(tert-butyl-peroxyisopropyl)benzene, n-butyl-4,4-bis(tert-butylperoxy)valerate, 2,2-bis(tert-butylperoxy)butane, 1,1-bis(tert-butyl-peroxy)cyclohexane, 1,1-bis(tert-butylperoxy)-3,3,5-trimethyl-cyclohexane, tert-butyl peroxybenzoate, benzoyl peroxide, and the like and mixtures or combinations thereof. Preferably the organic peroxide decomposes at a temperature of about 100° C. or higher to generate radicals. More preferably, the organic peroxides have a decomposition temperature which affords a half life of 10 hours at about 70° C. or higher to provide improved stability for blending operations. Typically, the organic peroxides will be added at a level of between about 0.01 to about 10 weight percent based on the total weight of the acid copolymer or ionomer composition. If desired, initiators, such as dibutyltin dilaurate, may be used. Typically, initiators are added at a level of from about 0.01 to about 0.05 weight percent based on the total weight of the acid copolymer or ionomer composition. If desired, inhibitors, such as hydroquinone, hydroquinone monomethyl ether, p-benzoquinone, and methylhydroquinone, may be added for the purpose of enhancing control to the reaction and stability. Typically, the inhibitors would be added at a level of less than about 5 weight percent based on the total weight of the polymeric composition.

It is understood that the unplasticized high modulus polymeric compositions used herein may further contain any additive known within the art, such as, processing aides, flow enhancing additives, lubricants, pigments, dyes, flame retardants, impact modifiers, nucleating agents, anti-blocking agents such as silica, thermal stabilizers, UV absorbers, UV stabilizers, dispersants, surfactants, chelating agents, coupling agents, adhesives, primers, reinforcement additives, such as glass fiber, fillers and the like.

Thermal stabilizers can be used and have been widely disclosed within the art. Any known thermal stabilizer may find utility within the present invention. Preferable general classes of thermal stabilizers include, but are not limited to, phenolic antioxidants, alkylated monophenols, alkylthiomethylphenols, hydroquinones, alkylated hyldroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phbsphonites, benzylphosphonates, ascorbic acid (vitamin C), compounds that destroy peroxide, hydroxylamines, nitrones, thiosynergists, benzofuranones, indolinones, and the like and mixtures thereof. The unplasticized high modulus polymeric composition used herein may contain any effective amount of thermal stabilizers. Use of a thermal stabilizer is optional and in some instances is not preferred. When used, the unplasticized high modulus polymeric compositions contain at least about 0.05 wt %, and up to about 10 wt %, more preferably up to about 5 wt %, and most preferably up to about 1 wt %, of thermal stabilizers, based on the total weight of the composition.

UV absorbers can be used and have also been widely disclosed within the art. Any known UV absorber may find utility within the present invention. Preferable general classes of UV absorbers include, but are not limited to, benzotriazoles, hydroxybenzophenones, hydroxyphenyl triazines, esters of substituted and unsubstituted benzoic acids, and the like and mixtures thereof. The unplasticized high modulus polymeric compositions used herein may contain any effective amount of UV absorbers. Use of a UV absorber is optional and in some instances is not preferred. When used, the unplasticized high modulus polymeric compositions contain at least about 0.05 wt %, and up about 10 wt %, more preferably up to about 5 wt %, and most preferably up to about 1 wt %, of UV absorbers, based on the total weight of the composition.

Hindered amine light stabilizers (HALS) can be used and have also been widely disclosed within the art. Generally, hindered amine light stabilizers are disclosed to be secondary, tertiary, acetylated, N-hydrocarbyloxy substituted, hydroxy substituted N-hydrocarbyloxy substituted, or other substituted cyclic amines which further incorporate steric hindrance, generally derived from aliphatic substitution on the carbon atoms adjacent to the amine function. The unplasticized high modulus polymeric compositions used herein may contain any effective amount of hindered amine light stabilizers. Use of hindered amine light stabilizers is optional and in some instances is not preferred. When used, the unplasticized high modulus polymeric compositions contain at least about 0.05 wt %, and up to about 10 wt %, more preferably up to about 5 wt %, and most preferably, up to about 1 wt %, of hindered amine light stabilizers, based on the total weight of the composition.

Sheet or Film Structure and Formation

In accordance to the present invention, the interlayer sheet or film disclosed herein may be a single-layer sheet or film that is formed of the unplasticized high modulus polymeric material described above and has at least one surface embossed with certain patterns. Or, the interlayer sheet or film disclosed herein may be a multilayer sheet or film having at least one surface layer that is formed of the unplasticized high modulus polymeric material described above and has the outside surface of the at least one surface layer embossed with certain patterns. One advantage of multilayer sheets and films is that the desirable properties of more than one polymeric material can be tailored into the structure, while the more costly ingredients can be relegated to the inner or outer layers, where they may more efficiently meet the requirements of the end-use. The multilayer sheets or films disclosed herein may be varied through each layer's composition, each layer's thickness and the positioning of the various layers within the multilayer sheet or film. For example, in a tri-layer construct, the unplasticized polymeric material, described above, may be contained in the surface layers serving to enhance the adhesion, optical clarity, anti-block or physical properties, while the middle layer may provide optical clarity, structural support, shock absorbance, and the like or simply to provide a more cost efficient structure.

The other layers in the multilayer interlayer sheets or films of the present invention may be formed from any suitable polymeric material. Such suitable materials include, but are not limited to, acid copolymers and ionomers derived therefrom, poly(ethylene-co-vinyl acetate) (EVA), poly(vinyl acetal) (e.g., poly(vinyl butyral)), polyurethane (PU), polyvinylchloride (PVC), polyethylenes (e.g., metallocene-catalyzed linear low density polyethylenes), polyolefin block elastomers, ethylene acrylate ester copolymers (e.g., poly (ethylene-co-methyl acrylate) and poly(ethylene-co-butyl acrylate)), silicone elastomers and epoxy resins.

The interlayer sheets or films of the present invention may be produced by any suitable process known or yet to be known within the art. For example, the sheets or films may be formed through dipcoating, solution casting, compression molding, injection molding, melts extrusions, melt blowing, or any other procedures that are known to those of skill in the art. When the interlayer sheet or film comprises multiple layers, it may be formed through coextrusion, blown film, dipcoating, solution coating, blade, puddle, air-knife, printing, Dahlgren, gravure, powder coating, spraying, plying of preformed films and sheets, or other processes known in the art. Preferably, the multilayer sheets or films are produced through plying of preformed sheets or films or through extrusion casting processes.

Surface Treatment

If desired, one or both surfaces of the interlayer sheet or film may be treated to enhance the adhesion to other laminate layers. This treatment may take any form known within the art, including adhesives, primers, such as silanes, flame treatments, such as those disclosed within U.S. Pat. Nos. 2,632,921; 2,648,097; 2,683,894; and 2,704,382, plasma treatments, such as those disclosed in U.S. Pat. No. 4,732,814, electron beam treatments, oxidation treatments, corona discharge treatments, chemical treatments, chromic acid treatments, hot air treatments, ozone treatments, ultraviolet light treatments, sand blast treatments, solvent treatments, and the like and combinations thereof. For example, a thin layer of carbon may be deposited on one or both surfaces of the sheet or film through vacuum sputtering as disclosed in U.S. Pat. No. 4,865,711. Or, as it is disclosed in U.S. Pat. No. 5,415, 942, a hydroxy-acrylic hydrosol primer coating may serve as an adhesion-promoting primer for poly(ethylene terephthalate) films.

Surface Pattern

In accordance to the present invention, the at least one embossed surface of the interlayer sheet or film should have certain surface pattern to prevent air entrapment. Conventional surface patterns or textures require a large percentage of the volume of the material that is raised above the imaginary plane of the flattened interlayer sheet to flow to areas that lie below the imaginary plane. Interlayer material that is above (primarily) and below the plane (which is the interface of the interlayer and glass after the lamination step is complete) must flow through a combination of heat, applied pressure, and time. Each particular pattern of different peak heights, spacing, volume, and other descriptors necessary to define the surface geometry will yield a corresponding amount of work or energy to compress the surface pattern. The present invention provides certain surface patterns, when incorporated in the surface(s) of interlayer sheeting derived from unplasticized high modulus polymers, such as, ethylene acid copolymers or ionomers derived therefrom, can prevent premature contact or sealing to occur prior to sufficient air removal being accomplished whether air removal is to be achieved by conventional techniques such as roll pre-pressing or vacuum bags/rings and the like. In particular, the surface patterns disclosed herein, can allow for efficient de-airing but require less energy for compression (or at a controlled and desired level tailored for the prepress/de-airing process).

To measure the energy required to obtain a smooth or flattened surface for sheets having various surface topography, a DuPont Thermomechanical Analyzer (TMA) was used. As it is outlined in ASTM E2347-05, this instrument is capable of measuring very small changes in the thickness of a specimen located underneath a small round probe with a flattened end. Specifically, the TMA instrument can apply a specified pressure (force) to the interlayer sample at a given temperature for a given period of time. The changes on the interlayer's thickness prior and after the pressure is removed is recorded as the interlayer's latent elasticity. The use of the TMA test is to mimic the lamination roll-prepress process where a laminate would be heated to a given temperature and a certain force-time history would be applied to the sample in an attempt to drive air out from between the interlayer/glass interface(s) and once done (and often in the same step) also achieve an adequate edge seal (tack) around the perimeter of the laminate assembly. Likewise, the latent elasticity measurements using the TMA test can resemble the compression behavior of the surface pattern (roughness) within the lamination process since direct in-situ measurements are not readily obtainable. In accordance to the present invention, the surface pattern used herein should provide the unplasticized high modulus interlayer sheet or film a latent elasticity of about 5 to about 10 microns after the application of about 0.031 Newtons/mm pressure for 3 seconds and less than about 5 microns after the application of about 0.407 Newtons/mm² pressure for 3 seconds.

Figure 4:
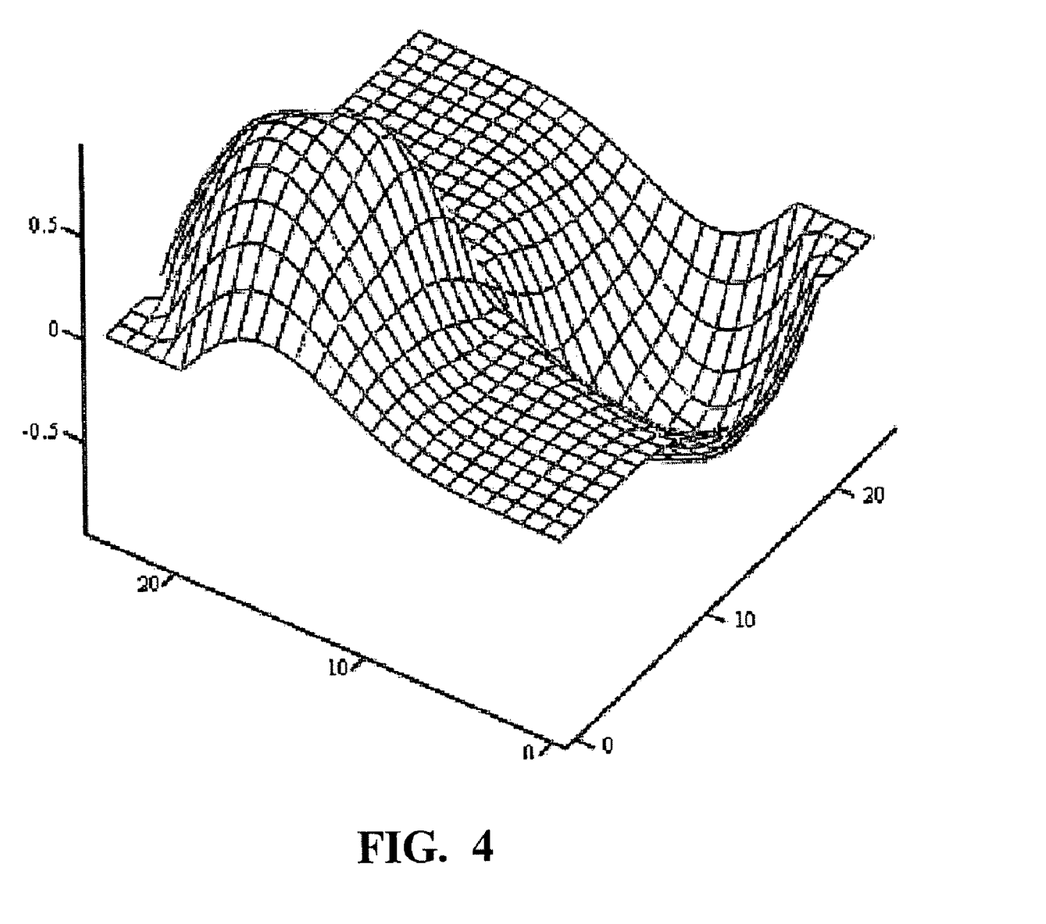
FIG. 4 is a drawing (not to scale) of one particular surface pattern disclosed in the present invention showing both raised and indented, or burrowed, areas.

In one particular embodiment, the surface pattern of the present invention comprises projections upward from the base surface as well as voids, or depressions, downward from the base surface in a way that the projections and depressions are of similar or the same volume, and located in close proximity to each other. Preferably, the projections and depressions are located such that heating and compressing the interlayer surface would result in more localized flow of the thermoplastic material from an area of higher thermoplastic mass (that is, a projection) to a void area (that is, depression), i.e., the voids would be filled with the mass from a local projection, such as the surface patterns shown in FIG. 4. Localized flow of the thermoplastic resin material to obtain a flattened surface would require less of an energy investment than a more conventional pattern, which requires a mass flow of thermoplastic material across the entire surface of the interlayer. Accordingly, the surface pattern disclosed herein can be flattened with relative ease as compared with the conventional surface patterns, when they are incorporated to surface(s) of interlayer sheeting formed of unplasticized high modulus polymers.

In another embodiment of the present invention, the surface pattern disclosed herein comprises at least two uninterrupted channels for de, airing in at least two non-parallel directions, wherein the channels have a width ranging from about 30 to about 300 µm, or preferably from about 40 to about 250 µm, or more preferably, from about 50 to about 200 µm, and a depth ranging from about 2 to about 80 µm, or preferably, from about 2 to about 25 µm, or more preferably, from about 12 to about 25 µm, or yet more preferably, from about 14 to about 20 µm. In addition, the surface channels are preferably spaced from about 0.1 to about 1 mm apart, or more preferably, from about 0.1 to about 0.9 mm apart, or yet more preferably, from about 0.15 to about 0.85 mm apart.

Figure 5:
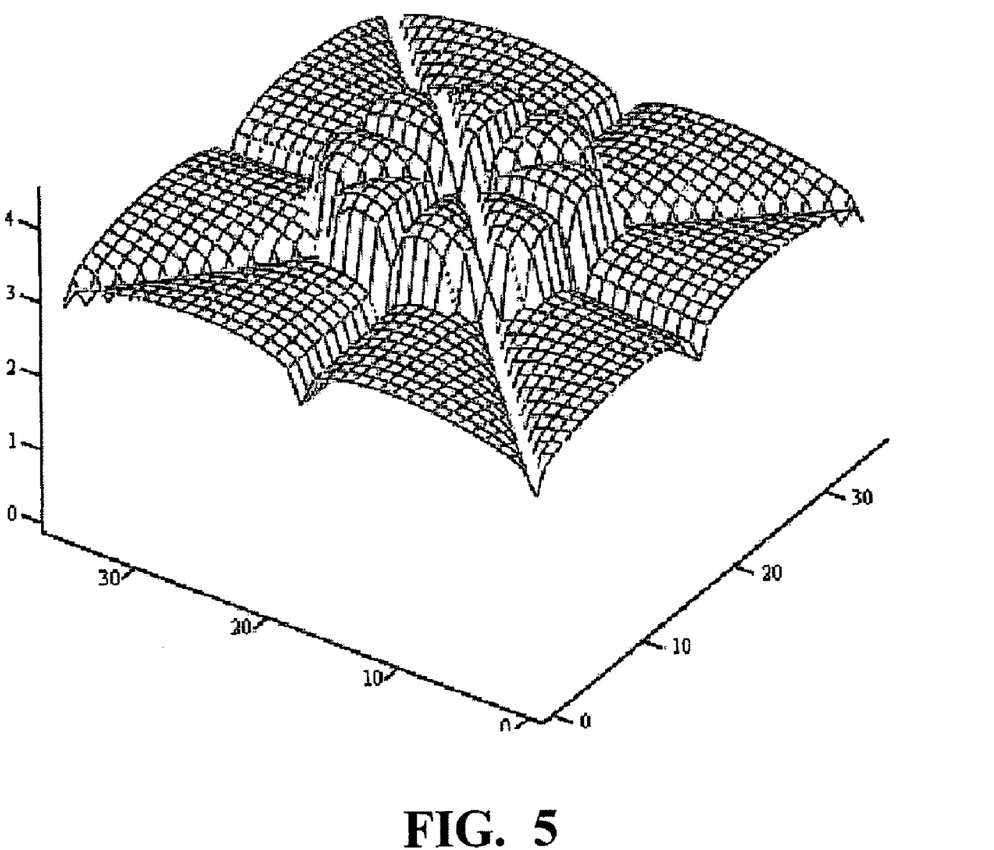
FIG. 5 is a drawing of an alternative surface pattern that can be used according to the present invention. The raised areas and de-airing recesses are not shown to scale.
Figure 6:
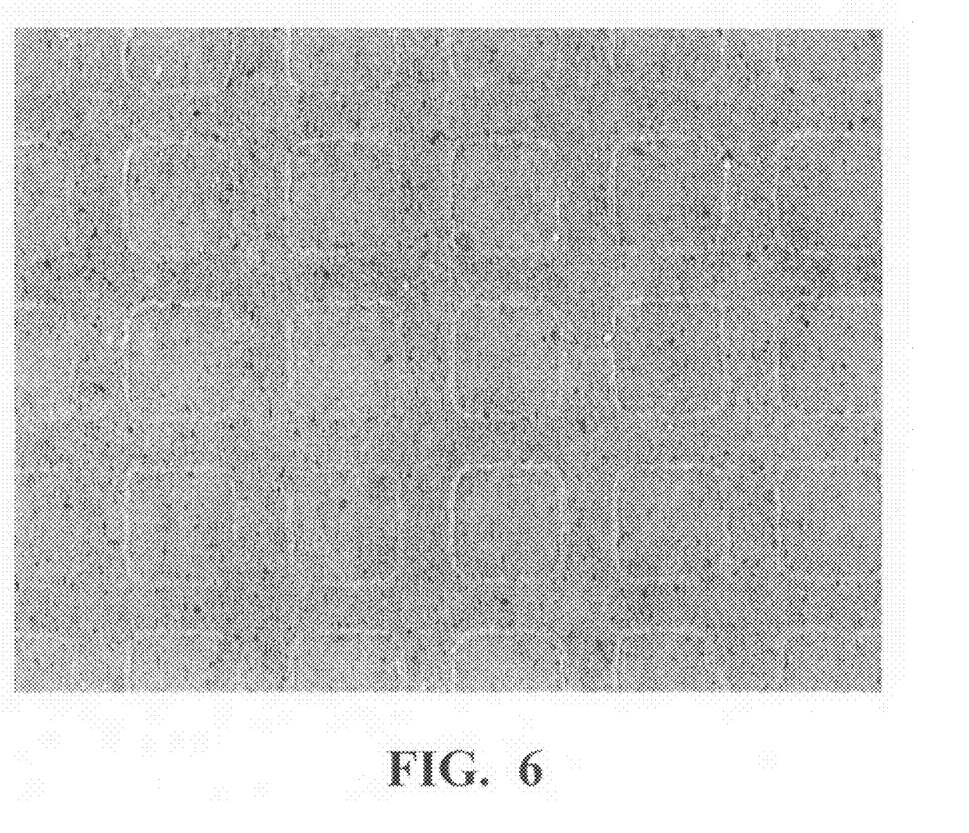
FIG. 6 is a photomicrograph of a preferred embossed surface having a pattern with protrusions having a mound average width of 350 µm, a valley average width of 136 µm, and a valley average depth of 15.0 µm.

It should be noted that the surface pattern preferably contains channels in two or more directions. In a preferred embodiment of the present invention, the surface pattern should contain channels in two directions, preferably (in one embodiment) perpendicular to each other, such as shown in FIG. 6. Other embodiments can have channels in three or more directions, such as shown in FIG. 5.

Surface roughness, Rz, can be expressed in microns by a 10-point average roughness in accordance with ISO-R468 of the International Organization for Standardization and ASMEB46.1 of the American Society of Mechanical Engineers. For an interlayer sheeting of the present invention, when the thickness is about 0.76 mm or greater, 10-point average roughness, Rz, of up to 80 µm is sufficient to prevent air entrapment. Surface roughness, Rz, measurements from single-trace profilometer measurements can be adequate in characterizing the average peak height of a surface with roughness peaks and valleys that are nearly randomly distributed. However a single trace profilometer may not be sufficient in characterizing the texture of a surface that has certain regularities, particularly straight lines. In characterizing such surfaces, if care is taken such that the stylus does not ride in a groove or on a plateau, the Rz thus obtained can still be a valid indication of the surface roughness. Other surface parameters, such as the mean spacing (R Sm) may not be accurate because they depend on the actual path traversed. Parameters like R Sm can change depending on the angle the traversed path makes with the grooves. Surfaces with regularities like straight-line grooves are better characterized by three-dimensional or area roughness parameters such as the area peak height, $AR_p$, and the total area roughness, $AR_t$, and the area kurtosis (AKu) as defined in ASME B46.1. $AR_p$ is the distance between the highest point in the roughness profile over an area to the plane if all the material constituting the roughness is melted down. $AR_t$ is the difference in elevation between the highest peak and the lowest valley in the roughness profile over the area measured. In yet another embodiment of the present invention, the surface pattern disclosed herein has a $AR_t$ less than 32 µm, a ratio of $AR_p$ to $AR_t$ ranging between 0.42 and 0.62, or preferably, between 0.52 and 0.62, and an area kurtosis less than about 5, or preferably, less than about 2.5.

The interlayer sheet or film of the present invention can be embossed on one or both sides. The embossed surface pattern and/or the depth thereof can be asymmetric with respect to the two sides of the interlayer sheet or film. That is, the embossed surface patterns can be the same or different, as can be the depth of the pattern on either side of the sheet or film. In a preferred embodiment, the interlayer sheet or film of the present invention has an embossed surface pattern on each side wherein the depth of the pattern on each side is in the range of about 12 to about 25 µm. In a particularly preferred embodiment, there is an embossed surface pattern on one side of the interlayer sheet or film that is orthogonal to the edges of the sheet or film, while the identical embossed pattern is slanted at some angle that is greater than or less than 90° to the edges, and the depth of the embossed patterns is in the range of from about 12 to about 25 µm. Offsetting the patterns in this manner can eliminate an undesirable optical effect in the sheet or film.

Several additional criteria may also be considered in the design of an appropriate surface pattern or texture for sheeting handling, ease of positioning, blocking tendency, ease of cleaning, de-airing and possessing a robust process window for laminate manufacture.

The surface pattern, as described above, may be applied to the sheet or film through common art processes. For example, when an interlayer sheet or film is produced through extrusion, it may be passed over a specially prepared surface of a die roll positioned in close proximity to the exit of the die which imparts the desired surface characteristics to one side of the molten polymer. Thus, when the surface of such roll has minute peaks and valleys, the sheet or film formed of polymer cast thereon will have a rough surface on the side which contacts the roll, and the rough surface will generally conform respectively to the valleys and peaks of the roll surface. Such die rolls are disclosed in, e.g., U.S. Pat. No. 4,035,549. As it is known, this rough surface is only temporary and particularly functions to facilitate de-airing during laminating, and after which, it is melted smooth from the elevated temperature and pressure associated with autoclaving and other lamination processes.

Glass Laminates

In another embodiment, the present invention is a laminate comprising at least one layer derived from the interlayer sheet or film described above. For example, the laminate of the present invention may be formed by laminating at least one layer of the present interlayer sheet or film with one or more layers of glass, polymeric films, polymeric sheets, metal films, metal sheets, and the like and combinations thereof. Preferably, the laminate of the present invention comprises at least one layer of glass and at least one layer of the present interlayer sheet or film. More preferably, the laminate of the present invention comprises two outside layers of glass and one inner layer formed of the present interlayer sheet or film.

Such laminates of the present invention are suitable for use as safety glazing in a variety of applications. For example, they can be suitable for use in automobiles, airplanes, trains, or other modes of transportation. Other suitable applications for safety glazing are well known, including for example, windows in homes and buildings, building facades, cabinets, and weight bearing architectural structures (e.g., stairs and floors).

EXAMPLES

The following Examples and Comparative Examples are intended to be illustrative of the present invention, and are not intended in any way to limit the scope of the present invention.

Example 1

Surface Roughness Characterization

Surface roughness, Rz, can be expressed in microns by a 10-point average roughness in accordance with ISO-R468 of the International Organization for Standardization. Roughness measurements are made using a stylus-type profilometer (Surfcom 1500A manufactured by Tokyo Seimitsu Kabushiki Kaisha of Tokyo, Japan) as described in ASME B46.1-1995 using a trace length of 26 mm. $AR_p$ and $AR_t$, and the area kurtosis are measured by tracing the roughness over a 5.6 mm×5.6 mm area in 201 steps using the Perthometer Concept system manufactured by Mahr GmbH, Gottingen, Germany.

De-Airing Efficiency at Room Temperature

Figure 1A:
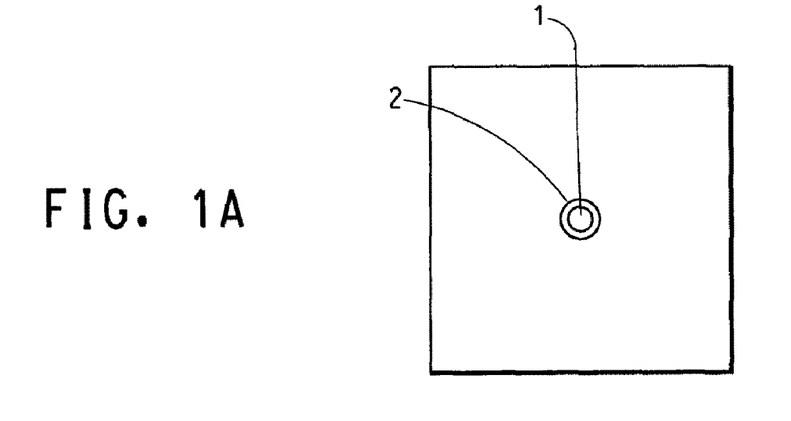
FIG. 1A is a top-side view of a pre-laminate assembly used for testing the de-airing efficiency of an interlayer sheet or film.
Figure 1B:
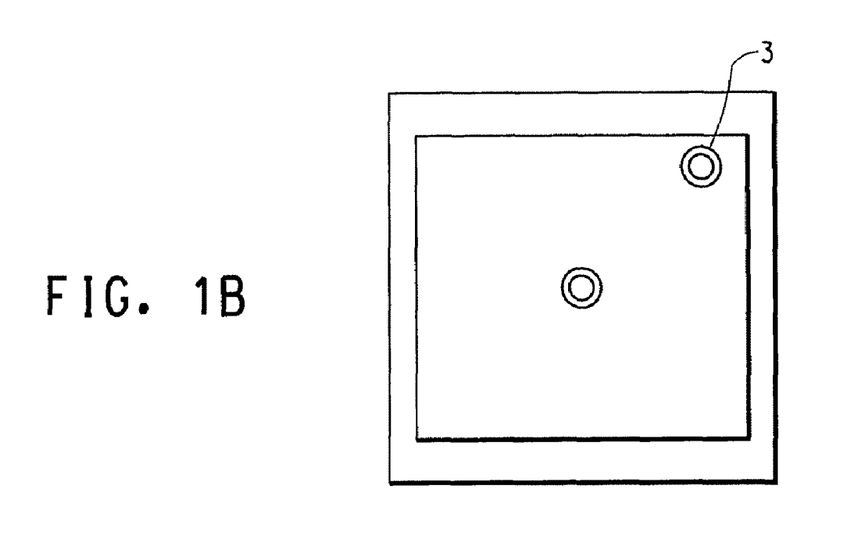
FIG. 1B is a top-side view of the pre-laminate assembly from FIG. 1A which was placed in a vacuum bag.
Figure 1C:
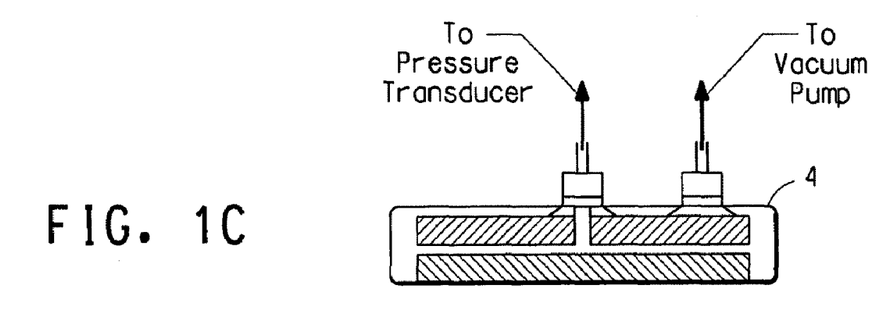
FIG. 1C is a cross-sectional view of the pre-laminate structure shown in FIG. 1B, along a diagonal.

De-airing efficiency of an interlayer with a specified pattern is determined by measuring the absolute pressure of the interstitial space in an assembly. Now referring to FIGS. 1A-1C, the interlayer to be tested is assembled as a normal assembly, except that the top plate of glass has a hole (1) drilled through its center. The glass, the interlayer, and all auxiliary equipment are equilibrated to 22.5±2.5° C. for one hour before testing. If an interlayer has two distinctly different patterns on either side, the side with the surface pattern to be evaluated is placed in contact with the piece of glass that has the hole (1). The base of a pressure (or vacuum) coupler (2) is affixed and sealed around the hole in the glass (a pressure or vacuum coupler is a device which, when connected, enables air to move between an enclosure and the outside). A piece of fabric (about 30 mm wide) is wrapped around the edges of the assembly. The base of another vacuum coupler (3) is placed on top of two layers of cotton fabric (50 mm×50 mm) in one of the corners. The assembly with the peripheral breather and two base plates of couplers are then placed inside a 0.1-mm thick nylon bag (4). The bag is sealed. Cross-marks are cut through the bag just above the base plates. Vacuum couplers are attached through the nylon bag and care is taken to ensure that there are no leaks. The corner plate is attached to the vacuum source (nominally 84 kPa below atmospheric), while the center plate is attached to a vacuum gauge or a calibrated pressure transducer. The gauge reading (or transducer output) is recorded at given intervals after the vacuum is applied. The recorded data contain the absolute interstitial pressure at 10-second intervals for the first minute after vacuum is applied, at 15'-second intervals thereafter for one-half minute, at 30-second intervals thereafter for another one-half minute, and at one-minute intervals thereafter up to 10 minutes after the application of vacuum. A surface that allows for efficient vacuum de-airing would cause the absolute interstitial pressure to drop rapidly within a few minutes. The interstitial pressure at 90 seconds after evacuation is indicative of how well the interlayer de-airs. If at 90 seconds after evacuation, the absolute interstitial pressure is above 53.3 kPa, de-airing is inadequate, and the interlayer is not suitable for vacuum de-airing.

De-Airing Efficiency at Elevated Ambient Temperature

Determination of de-airing efficiency at high (elevated) ambient temperature is the same as that at room temperature, except that the interlayer to be tested, the glass, couplers are all equilibrated to 30.5±2.5° C. prior to testing. If at 90 seconds after evacuation, the absolute interstitial pressure is above 53.5 kPa, de-airing is inadequate, and the interlayer is not suitable for vacuum de-airing when the ambient temperature is elevated, as in the summer.

Pre-Press Haze Measurement

A pre-press is made from each interlayer tested. The TAAT glass orientation is used. An interlayer is placed between two pieces of glass, the excess interlayer is trimmed. The glass/interlayer/glass sandwich, referred to as an assembly, is placed in a 0.1-mm (nylon) plastic bag. A vacuum adapter allows a vacuum hose to be connected to the inside of the plastic bag after it is sealed. The bag with the assembly inside is evacuated for 90 seconds at 53.3 kPa vacuum (48.0 kPa absolute pressure) at ambient temperature (22.5° C.±2.5° C.). After the initial vacuum, the nylon bag and its contents and the vacuum hose is placed inside an oven and kept at 120-122° C. for 6 minutes. At the end of that time, the nylon bag is removed from the oven and the vacuum hose is disconnected immediately. The glass/interlayer/glass structure at this stage is called a pre-press. Depending on the starting interlayer roughness, the pre-press may appear hazy or clear. Haze is measured by using a Hazegard hazemeter from Gardner in eight places in the pre-press. The results can be averaged.

Example 2

In this and the following examples, ionomers having about 19 weight percent of polymerized residues of a methacrylic acid and about 37% neutralized with sodium ion were used to form various 2.3 mm thick and 600 mm square big ionomer sheets.

Before they were embossed with various surface patterns, ionomer sheets with low haze and smooth, essentially parallel surfaces were obtained as follows. First, the ionomer sheeting was placed between two sheets of abrasion-resistant coated polycarbonate (Lexan™ MR 3/16" thickness). This sandwich structure was then vacuum-bagged using standard techniques and a vacuum was drawn on the assembly for 30 minutes at about 30 torr absolute pressure. After this de-airing step, the vacuum-bagged assembly was heated in a conventional air oven to 120° C. for 45 minutes after which it was cooled back down to room temperature while under vacuum.

These smooth surfaced ionomer sheets were then embossed with textured rubber sheets, metal mesh, or other materials to create a variety of roughened/textured surfaces.

In one case, to obtain an ionomer sheet with embossed surface(s), the sheet was placed between two rubber plates. The rubber surfaces in contact with the ionomer sheet were engraved with a pattern with ridges that form a grid pattern. The ridges were approximately 12 μm in width and 45 μm in height, and were spaced such that there were approximately 9 grids per square mm. The rubber/sheet/rubber sandwich assembly was placed between two pieces of nominally 3.2 mm thick annealed glass. The 5-ply sandwich was put inside of a woven nylon bag, and the nylon bag and its contents were placed inside of a rubber vacuum bag. The rubber vacuum bag was fitted with a piece of tubing which was sealed through the edge of the bag, and which enabled connection to a vacuum source. The open end of the vacuum bag was closed. Vacuum (at least 80 kPa below atmospheric) at ambient temperature (22.5±2.5° C.) was applied for 5 minutes. Immediately thereafter, the vacuum bag with its contents was placed in an oven at 120° C. for 40 minutes. After that time, the vacuum bag was removed from the oven. Vacuum was disconnected, and the vacuum bag and its contents were allowed to cool to room temperature. One of the engraved rubber plates was gently removed to expose the now embossed ionomer sheet. The ionomer sheet was then gently peeled off from the second embossed rubber plate. The embossed pattern on the ionomer sheet has a grid-pattern with ridges approximately 12 μm wide and 41 μm deep, and with approximately 9 grids per square mm.

In other cases, ionomer sheeting with embossed surface(s) was produced by the use of an extrusion line consisting of a twin-screw extruder, a sheet die, and a calendar roll. During the process, the calendar roll which has an embossed surface pattern engraved into the metal surface imparts to varying degrees a reverse image of the surface texture onto the polymer melt as it passes between and around the textured rolls.

Similarly, ionomer sheeting of the same composition having an embossed diamond pattern with an impression depth of about 2 mils (Rz 61.8 μm) was prepared. The diamonds were 'raised' areas on the sheet surface leaving relatively continuous channels to allow for air to flow when either vacuum was applied to the assembly or if outward force was applied (e.g. roll prepress nips) to progressively force a portion of the air out of the laminate assembly.

In addition, ionomer sheeting of the same composition having an embossed random pattern of finer detail than the diamond pattern was prepared. Such sheeting had a surface roughness, Rz, of 14.9 μm.

Example 3

A DuPont Thermomechanical Analyzer (TMA) was used to make delicate measurements of the degree of compression as a function of the applied force and parameters of time and temperature. Some of the 'bulk' flow properties are displayed in Table 1 where the displacement of the TMA probe was indexed at 20% or 60% of the respective thickness of the interlayer sheet under study (PVB or ionomer). At each force level, the temperature was ramped at 5° C./minute from −20° C. to 200° C. and the temperature was recorded when each of the compression indices was obtained. The results in Table 1 demonstrate the rheology differences between interlayer types as a cross-over in polymer "displacement" occurs as a function of applied force and temperature.

TABLE 1

|  |  | Temperature (° C.) for Probe to Reach 20% and 60% Compression of Interlayer Thickness (Indentation Temperature) | | | |
| --- | --- | --- | --- | --- | --- |
|  |  | TEMP. @ −60% | | TEMP. @ −20% | |
| Weight on Probe (gms) | Pressure (N/mm$^2$) | PVB | Ionomer | PVB | Ionomer |
| 3 | 0.0060 | 151 | 142 | 134 | 114 |
| 15 | 0.0300 | 131 | 114 | 108 | 97 |
| 50 | 0.0999 | 113 | 103 | 89 | 91 |
| 681 | 1.3605 | 58 | 85 | 64 | 80 |

Example 4

Figure 2:
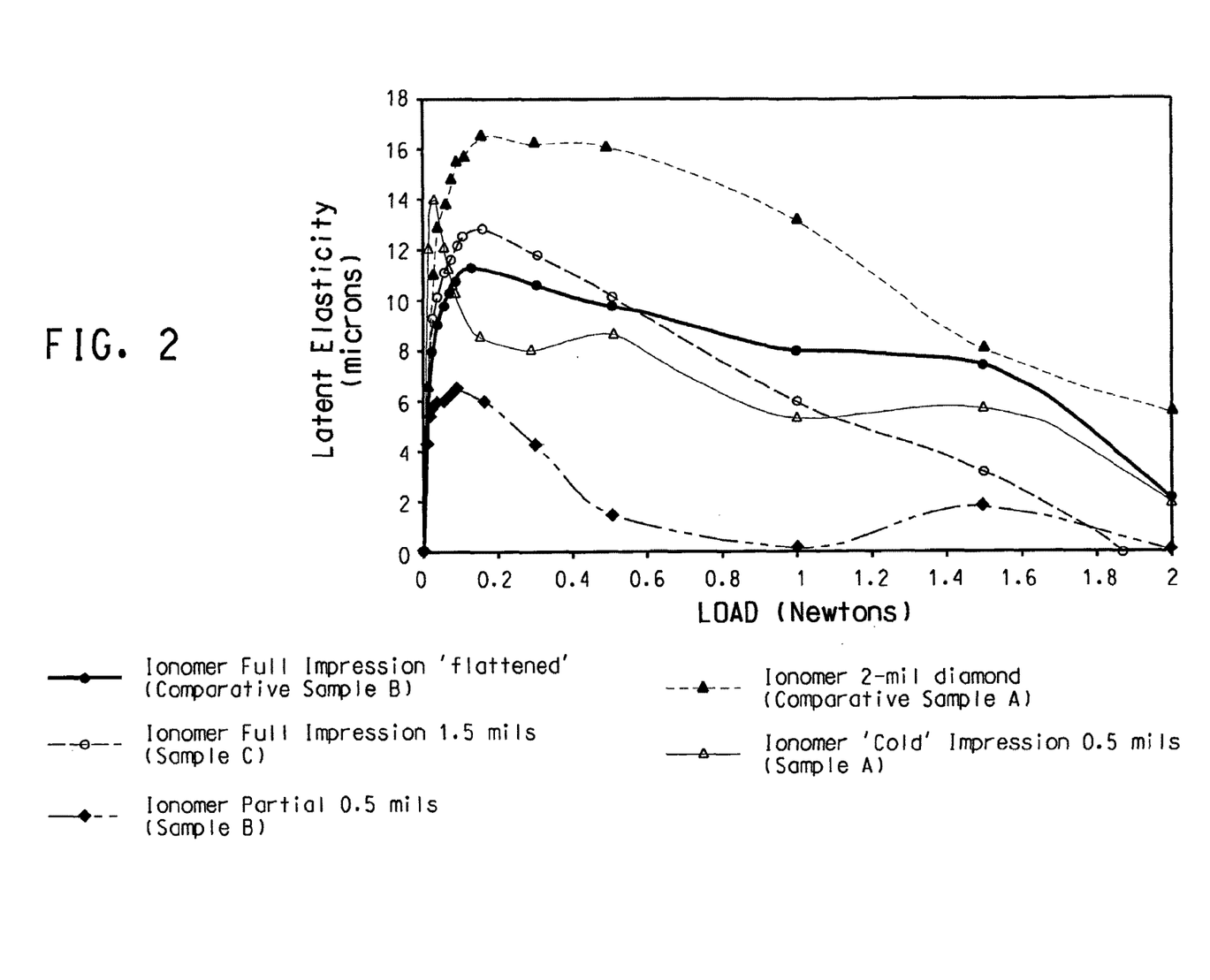
FIG. 2 is a graphical depiction of the thermomechanical analysis of the surface roughness of various ionomeric surfaces.
Figure 3:
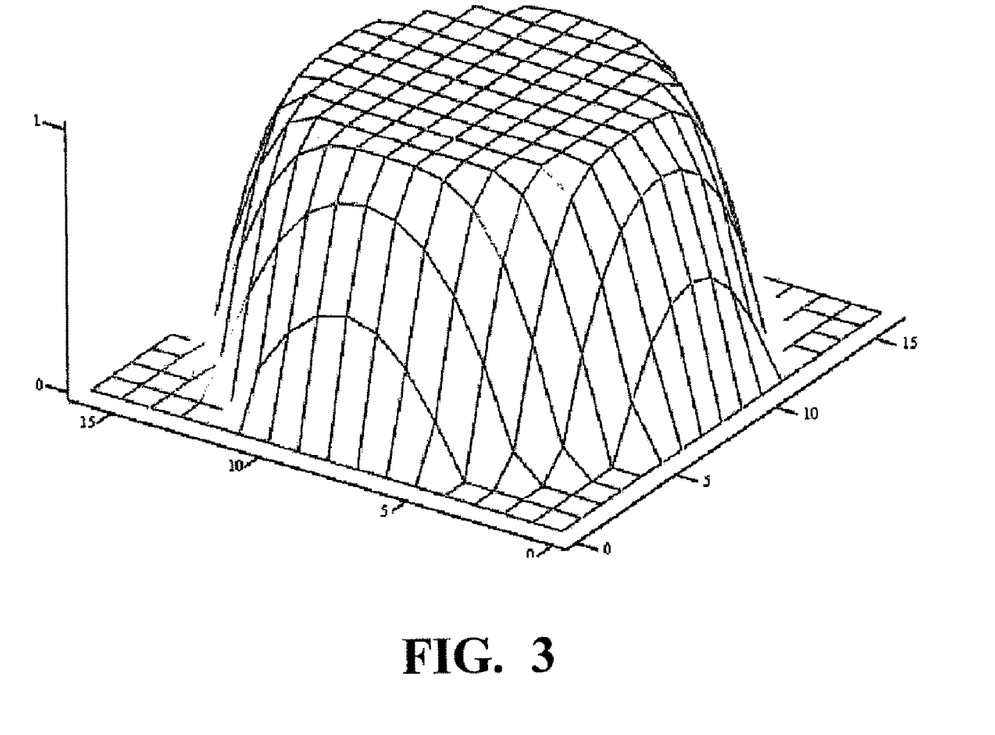
FIG. 3 is a drawing (not to scale) of surface protrusion as a "raised" volume of polymer.

The pre-smoothed ionomer interlayers were embossed with a variety of surface textures by placing a textured surface against the interlayer and applying pressure and slightly heating (extending from room temperature up through a complete molten state (e.g. 120° C.). Such ionomer interlayers with various embossed surface patterns were subject to TMA test at a temperature of about 70° C., and their latent elasticity values under different pressures were recorded. Shown in FIG. 2 is a plot of the latent elasticity of each embossed ionomer sheet subtracting the latent elasticity of a pre-smoothed ionomer sheet at the same condition.

The ionomer interlayers with embossed surfaces were also used to prepare Numerous laminates (300 mm square) by the above mentioned roll pre-pressing to check laminating performance and quality. Annealed glass (3 mm thickness) was washed with detergent (trisodium phosphate at 3 gms/liter) and rinsed thoroughly with de-mineralized water and allowed to air dry. Pre-laminate assemblies were created by sandwiching the respective interlayers between two pieces of said glass and taping in a couple locations to secure the relative positions of the layers to one another. Some of these results are shown in Table 2.

after a 3-sec application of a 0.031 Newtons/mm$^2$ pressure and a latent elasticity of less than about 5 microns after a 3-sec application of a 0.407 Newtons/mm$^2$ pressure. It is worth mentioning that during the embossing process, the aluminum screen was completely pressed into the surface of the ionomer sheet of Comparative Sample B, and when the aluminum screen was being separated from the sheet, major rupture was generated on the sheet surface, which caused the edge blowing in the final laminate.

To further assess the quality of the laminate with regard to the amount of residual air that was trapped within the laminate during the pre-pressing step and subsequent autoclave step, a bake test was conducted. A ready measure of this bubble tendency as a quality indicator can be correlated against results from a bake test. This test consists of a progressive heating of the laminates in stages and observing where and how many (and size) bubbles appear and at what temperature. In this testing, laminate structures were heated

TABLE 2

| Emboss Material | Surface Pattern | Oven Temp. | Vacuum Bag Time (Impression) | Impression Haze % | % Haze after Roll Pre-pressing at 90° C. | Laminate Quality after Autoclaving |
|---|---|---|---|---|---|---|
| Std. 2-mil diamond pattern | Comparative Sample A 2-mil diamond | | Calendar stack | 31.9 | 7.3 | Edge blowin |
| Aluminum Screen | | 50° C. | 1 hr. | 2.9 | 0.5 | Trapped Air |
| Aluminum Screen | | 50° C. | 4 hrs. | 5.4 | 1.1 | Trapped Air |
| Aluminum Screen | Sample A "Cold" Impression (0.5 mils) | 50° C. | overnight | 5.5 | 1.2 | Good |
| Aluminum Screen | | 60° C. | 30 min. | 7.1 | 0.7 | Good |
| Aluminum Screen | | 60° C. | 1 hr. | 7.4 | 1.0 | Good |
| Aluminum Screen | | 60° C. | 4 hrs. | 6.8 | 0.9 | Good |
| Aluminum Screen | Sample B Partial (0.5 mils) | 60° C. | overnight | 8.3 | 1.1 | Good |
| Aluminum Screen | | 70° C. | 30 min. | 9.7 | 0.7 | Good |
| Aluminum Screen | | 70° C. | 4 hrs. | 26.9 | 0.6 | Good |
| Aluminum Screen | | 70° C. | over weekend | 31.5 | 0.8 | Good |
| Aluminum Screen | Sample C Full Impression (1.5 mils) | 80° C. | 30 min. | 16.2 | 1.1 | Good |
| Aluminum Screen | | 80° C. | 4 hrs. | 21.3 | 1.5 | Edge Blowin |
| Aluminum Screen | Comparative Sample B Full Impression "flattened" | 80° C. | over weekend | 15.4 | 2.4 | Edge Blowin |
| Tetko 7-74/36 PET mesh | | 90° C. | 30 min. | 54.1 | 0.6 | Good |
| Tetko 7-74/36 PET mesh | | 100° C. | 30 min. | 88.9 | 0.5 | Good |

Based on the data shown in FIG. 2 and Table 2, it is clear that in order to facilitate efficient de-airing during lamination, an ionomer sheet should have an embossed surface pattern that affords a latent elasticity of about 5 to about 10 microns to 105° C. held for 2 hours, followed by inspection for the formation of air bubbles, then the sample was progressively heated to 120° C., 135° C. and finally 150° C., repeating the inspection process after each heating and 2 hour hold time.

All laminates exhibited edge bubbles which is not unusual and is generally ignored by the standard practices used in the laminating industry. Table 3 provides results of the laminating process temperature range over a range of interlayer material types and surface textures.

The processing temperature range (process 'window') was found to be quite narrow (15° C.) for both Comparative Samples C and D as compared with Samples D, E and F where the process window is expanded to 35° C. (@2.0 m/min linear speed). This is due to the rapid softening of the ionomer material as the processing temperature approached and exceeded the melting point for ionomers (~96° C. by DSC). Little change in the process window temperatures was noted between the two different roll pre-press speeds tested (2 and 3.5 m/min.), which provides greater processing rates/throughput during manufacturing.

TABLE 3

| Laminating Studies of Various Interlayer Types with Differing Surface Texture/Roughness Vacuum Bag Approach and Roll Pre-pressing | | | Roll Pre-press Temperature Range (° C.) for Optimal Quality (Low Bubble Count in Bake Test) | | | | | |
|---|---|---|---|---|---|---|---|---|
| | Surface Pattern Roughness Measurements | | Vacuum bag (100 torr absolute pressure) | | Roll Pre-press linear speed | | | |
| | | | | | 2.0 meters/min. | | 3.5 meters/min. | |
| Interlayer Type | Roughness $R_t$ (top/bottom) | Area Kurtois (top/bottom) | Low | High | Low | High | Low | High |
| Comparative Sample C Ionomer 2-mil Diamond | 61.8/22.6 | 1.92/3.39 | 90 | 125 | 100 | 110 | 100 | 110 |
| Sample D State 37 | 21.6/11.2 | 3.01/1.59 | 75 | 125 | 90 | 110 | 90 | 110 |
| Sample E State 42 | 20.0/10.1 | 3.84/1.44 | 75 | 125 | 75 | 110 | 75 | 110 |
| Sample F State 42A | 17.9/8.1 | 3.34/1.48 | 75 | 125 | 75 | 110 | 75 | 110 |
| Comparative Sample D Ionomer 'random' | 14.9/6.9 | 8.94/4.21 | 75 | 125 | 75 | 90 | 70 | 90 |

What is claimed is:

1. A thermoplastic interlayer sheet or film comprising an unplasticized polymer selected from the group consisting of ethylene acid copolymers and ionomers derived therefrom having at least one embossed surface having a surface pattern that provides relatively uninterrupted channels for de-airing in at least two non-parallel directions that are spaced about 0.1 to about 1 mm apart and have a depth of about 2 to less than 20 µm and a width of about 30 to about 300 µm.

2. The thermoplastic interlayer sheet or film of claim 1, wherein the unplasticized polymer is the ethylene acid copolymer.

3. The thermoplastic interlayer sheet or film of claim 1, wherein the unplasticized polymer is the ionomer.

4. The thermoplastic interlayer sheet or film of claim 3, wherein the depth of the channels is about 14 to less than 20 µm.

5. The thermoplastic interlayer sheet or film of claim 4, wherein the width of the channels is about 40 to about 250 µm.

6. The thermoplastic interlayer sheet or film of claim 3, wherein the width of the channels is about 40 to about 250 µm.

7. The thermoplastic interlayer sheet or film of claim 1, wherein the at least one embossed surface has a total area roughness, $AR_t$, of less than 32 µm, a ratio of area peak height $(AR_p)/AR_t$ of between 0.42 and 0.62, and an area kurtosis, AKu, of less than about 5.

8. The thermoplastic interlayer sheet or film of claim 7, wherein the ratio of $AR_p/AR_t$ is between 0.52 and 0.62.

9. The thermoplastic interlayer sheet or film of claim 7, wherein the area kurtosis, AKu, is less than about 2.5.

10. The thermoplastic interlayer sheet or film of claim 9, wherein the film is a film consisting essentially of ethylene acid copolymer.

11. The thermoplastic interlayer sheet or film of claim 9, wherein the film is a film consisting essentially of ionomer.

12. The thermoplastic interlayer sheet or film of claim 11, wherein the depth of the channels is about 14 to less than 20 µm and the width of the channels is about 40 to about 250 µm.

13. A pre-laminate comprising the thermoplastic interlayer sheet or film of claim 12 and two layers of glass on opposite sides of the thermoplastic interlayer sheet or film.

14. A process of preparing a glass laminate comprising (i) providing the pre-laminate of claim 13; and (ii) subjecting the pre-laminate structure to heat to bind the thermoplastic interlayer sheet to the glass layer.

15. The thermoplastic interlayer sheet or film of claim 7, wherein the film is a film consisting essentially of ethylene acid copolymer.

16. The thermoplastic interlayer sheet or film of claim 7, wherein the film is a film consisting essentially of ionomer.

17. The thermoplastic interlayer sheet or film of claim 1, wherein both surfaces of the thermoplastic interlayer sheet or film comprises an embossed surface pattern that provides relatively uninterrupted channels for de-airing in at least two non-parallel directions and wherein the channels are spaced about 0.1 to 1 mm apart and have a depth of about 2 to less than 20 µm and a width of about 30 to 300 µm.

18. A pre-laminate comprising the thermoplastic interlayer sheet or film of claim 1 and a glass layer.

19. The pre-laminate of claim 18, which comprises two layers of glass on opposite sides of the thermoplastic interlayer sheet or film.

20. A process of preparing a glass laminate comprising (i) providing the pre-laminate of claim 18; and (ii) subjecting the pre-laminate structure to heat to bind the thermoplastic interlayer sheet to the glass layer.

21. The process of claim 20, wherein the film is a film consisting essentially of ionomer and the ionomer is derived from an ethylene-methacrylic acid copolymer.

22. The thermoplastic interlayer sheet or film of claim 1, wherein the film is a film consisting essentially of ionomer and the ionomer is derived from an ethylene-methacrylic acid copolymer.

* * * * *